United States Patent
Monobe et al.

(10) Patent No.: US 10,108,282 B2
(45) Date of Patent: Oct. 23, 2018

(54) ELECTRONIC DEVICE

(71) Applicant: Panasonic Intellectual Property Management Co., Ltd., Osaka (JP)

(72) Inventors: Ruriko Monobe, Osaka (JP); Norikazu Kaneda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/846,944

(22) Filed: Sep. 7, 2015

(65) Prior Publication Data

US 2016/0077643 A1 Mar. 17, 2016

(30) Foreign Application Priority Data

Sep. 11, 2014 (JP) ................................. 2014-185555
Jul. 31, 2015 (JP) ................................. 2015-151430

(51) Int. Cl.
| | |
|---|---|
| G06F 3/041 | (2006.01) |
| G06F 3/044 | (2006.01) |
| H04N 5/225 | (2006.01) |
| G03B 17/02 | (2006.01) |
| H01H 19/00 | (2006.01) |

(52) U.S. Cl.
CPC .......... G06F 3/0412 (2013.01); G03B 17/02 (2013.01); G06F 3/044 (2013.01); H04N 5/2252 (2013.01); H01H 19/001 (2013.01)

(58) Field of Classification Search
CPC ....... G06F 3/0412; G06F 3/044; H01H 25/06; H04N 5/2252

USPC ..... 345/156, 173–179; 348/207.99, 373–376
See application file for complete search history.

(56) References Cited

U.S. PATENT DOCUMENTS

| | | | | |
|---|---|---|---|---|
| 2002/0015102 | A1* | 2/2002 | Itoh ..................... | H04M 1/0208 348/333.06 |
| 2007/0070239 | A1* | 3/2007 | Hirooka ............... | H04N 5/2251 348/375 |
| 2009/0244351 | A1* | 10/2009 | Takamatsu ......... | H04N 5/23293 348/333.01 |
| 2009/0273574 | A1* | 11/2009 | Pryor ..................... | B60K 35/00 345/173 |
| 2010/0113101 | A1* | 5/2010 | Tanada .................. | G06F 1/1626 455/566 |
| 2010/0315371 | A1 | 12/2010 | Katsu et al. | |
| 2012/0023459 | A1* | 1/2012 | Westerman ......... | G06F 3/03547 715/863 |

(Continued)

FOREIGN PATENT DOCUMENTS

| | | |
|---|---|---|
| JP | 11-112634 | 4/1999 |
| JP | 2009-181244 | 8/2009 |

(Continued)

*Primary Examiner* — Stacy Khoo
(74) *Attorney, Agent, or Firm* — Wenderoth, Lind & Ponack, L.L.P.

(57) ABSTRACT

An electronic device includes: a casing; a first operation unit that is on the casing and receives an operation from a user; a second operation unit that is on the casing and receives an operation from the user; and a first protection barrier between the first operation unit and the second operation unit protruding from a plane of the casing on which the first operation unit and the second operation unit are disposed.

9 Claims, 9 Drawing Sheets

(56) References Cited

U.S. PATENT DOCUMENTS

| | | | |
|---|---|---|---|
| 2012/0110511 A1* | 5/2012 | Howard | G06F 3/0488 |
| | | | 715/835 |
| 2012/0182240 A1 | 7/2012 | Urushihata | |
| 2013/0010169 A1 | 1/2013 | Tochio et al. | |
| 2013/0215062 A1 | 8/2013 | Katsu et al. | |
| 2014/0320416 A1 | 10/2014 | Katsu et al. | |
| 2015/0189048 A1* | 7/2015 | McLaughlin | H04M 1/2155 |
| | | | 455/569.1 |
| 2015/0193067 A1 | 7/2015 | Katsu et al. | |

FOREIGN PATENT DOCUMENTS

| | | |
|---|---|---|
| JP | 2012-150608 | 8/2012 |
| JP | 2013-034195 | 2/2013 |

* cited by examiner

ELECTRONIC DEVICE

BACKGROUND

1. Technical Field

The present disclosure relates to an electronic device (for example, an imaging apparatus) including a plurality of operation units provided to be close to one another. Particularly, the present disclosure relates to an electronic device in which one of the plurality of operation units is a touch operation unit.

2. Description of the Related Art

Electronic devices, such as smartphones, cellular phones, or digital cameras, equipped with a liquid crystal touch panel which enables an input with a touch operation, have been widespread (for example, refer to Unexamined Japanese Patent Publication No. 2009-181244).

For example, there has been known a digital camera including, on its back surface, a display unit and a touch panel superimposed on the display unit (for example, Unexamined Japanese Patent Publication No. 2013-34195). A user can set a function of a digital camera or can designate a region he/she intends to focus on, while seeing an image captured by an image sensor such as a CCD, with a touch operation on a touch panel. A digital camera generally has various operation buttons and operation dials around a touch panel, for example, at a portion above the touch panel or at the side of the touch panel.

When a user operates an operation button or an operation dial (a dial) disposed around a touch panel of such a digital camera with the touch panel, he/she may touch the touch panel with his/her fingers by mistake. In such a case, the touch panel responds to the erroneous touch operation (erroneous operation), which results in causing an action unintended by the user.

SUMMARY

The present disclosure provides an electronic device including a plurality of operation units (for example, a touch panel and an operation dial) which are provided to be close to one another, the electronic device reducing an erroneous operation to the operation unit (for example, a touch panel) disposed in the vicinity of a certain specific operation unit (for example, an operation dial), when the certain specific operation unit is operated.

An electronic device according to the present disclosure includes: a casing; a first operation unit that is provided to the casing and receiving an operation from a user; a second operation unit that is provided to the casing and receiving an operation from a user; and a first protection barrier formed between the first operation unit and the second operation unit so as to protrude from a plane of the casing to which the first and second operation units are provided.

The electronic device according to the present disclosure has the first protection barrier provided to protrude between the first operation unit and the second operation unit. With this configuration, when a user operates the second operation unit with his/her finger, this finger runs on the first protection barrier, whereby an erroneous touch on the first operation unit with the finger can be reduced. Thus, an erroneous operation to the first operation unit can be reduced.

DETAILED DESCRIPTION OF THE PREFERRED EMBODIMENTS

Exemplary embodiments will be described below in detail with reference to the drawings as necessary. However, unnecessarily detailed descriptions will sometimes be omitted. For example, detailed description of well-known matters and redundant description of substantially the same configuration may occasionally be omitted. This is to avoid the following description from becoming unnecessarily redundant, and to allow those skilled in the art to easily understand the description.

Note that the inventors of the present disclosure provide the accompanying drawings and the following descriptions for those skilled in the art to fully understand the present disclosure, and do not intend to limit a subject matter described in the claims by the accompanying drawings and the following descriptions.

First Exemplary Embodiment

1. Overall Configuration

Figure 1:
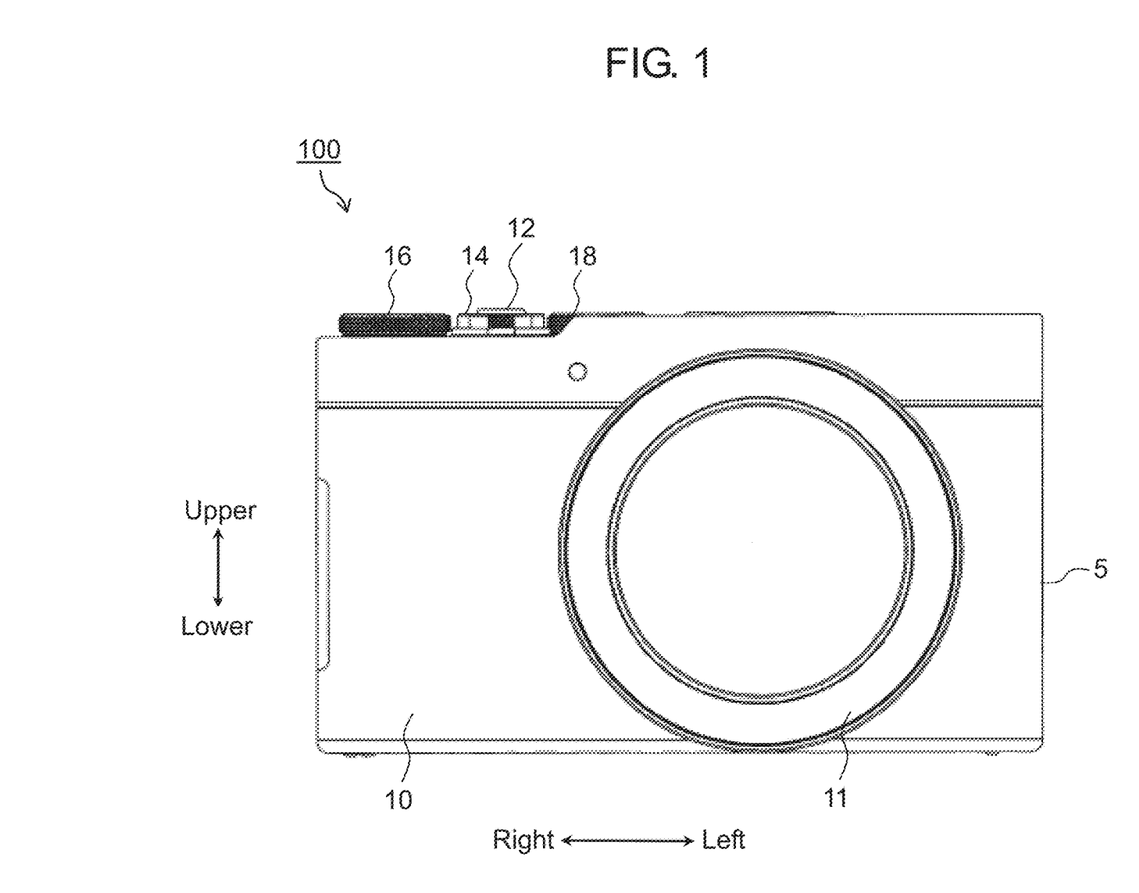
FIG. 1 is a front view of a digital camera according to a first exemplary embodiment.

A digital camera will be described below as one example of an electronic device. FIG. 1 is a front view of digital camera 100. Digital camera 100 is an interchangeable lens camera formed of interchangeable lens 11 including an optical system, and camera body 5 to which interchangeable lens 11 is attached and which includes an image sensor (such as a CCD or a CMOS image sensor). Digital camera 100 captures an object image incident via the optical system by using the image sensor to generate image data, and records the image data onto a predetermined recording medium (such as a semiconductor memory). In the description below, an object side is specified as a front side, and a side opposite to the object side is specified as a rear side (back side), with respect to digital camera 100. When a user normally holds digital camera 100, an upward direction in the vertical direction is specified as an upper side, and a downward direction in the vertical direction is specified as a lower side. When the front side is viewed from the back side, a left side in the horizontal direction is specified as a left side, and a right side in the horizontal direction is specified as a right side.

Interchangeable lens 11 is attached to camera body 5 via a mount. An optical system such as a focus lens, a zoom lens, and an iris is stored in interchangeable lens 11. Digital camera 100 also includes release button 12, power source lever 14, and operation dials 16 and 18 at a top of casing 10 of camera body 5.

Release button 12 is an operation unit by which a user performs an auto-focus instruction with a half-push of this button, or performs a shooting instruction with a full-push of this button. Power source lever 14 is an operation unit for turning on or off a power source of digital camera 100. Operation dials 16 and 18 are operation units to allow a user to select an image shooting mode such as an exposure priority mode (A mode) and a shutter priority mode (S mode); to select an image shooting mode (scene mode), such as a macro shooting and a night scene shooting, provided according to a scene; to set a shooting condition such as an ISO sensitivity and exposure correction; or to select an operation mode such as a moving-image recording mode and a reproduction mode.

Figure 2:
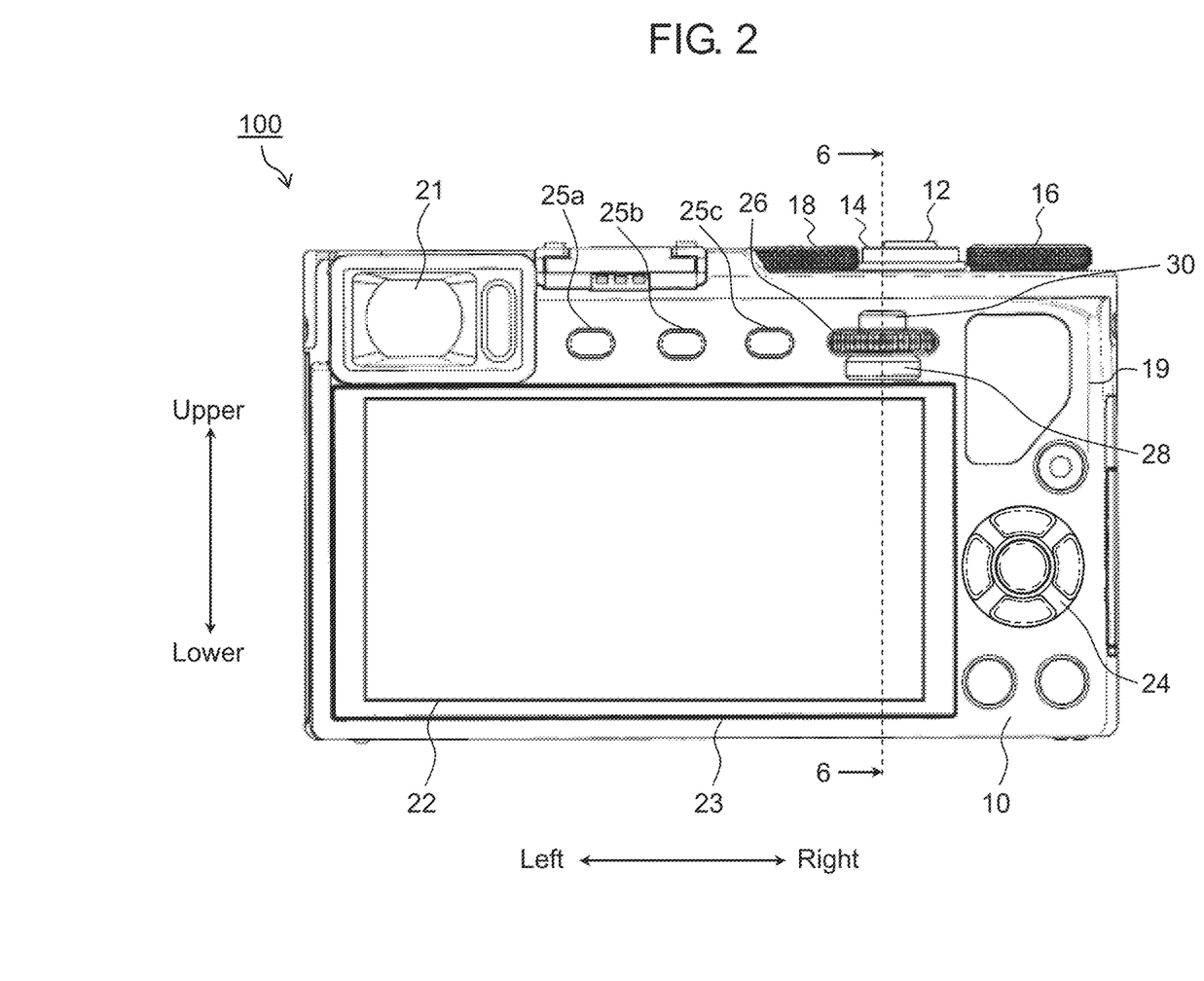
FIG. 2 is a back view of the digital camera according to the first exemplary embodiment.

FIG. 2 is a back view of digital camera 100 according to the present disclosure. As illustrated in FIG. 2, digital camera 100 has, on its back surface, view finder 21, liquid crystal touch panel 22, cover 23 protecting liquid crystal touch panel 22, and operation dial 26.

View finder 21 has inside a liquid crystal display device which displays an image. When shooting an image, a user can determine a composition of the image to be shot while looking into view finder 21 to visually recognize an image displayed onto view finder 21.

Liquid crystal touch panel 22 is a display device which displays an image captured by the image sensor in digital camera 100 in real time, displays an image reproduced from an image recorded onto a recording medium, and displays various setting screens. Generally, a display is switched such that an image is displayed on either one of view finder 21 and liquid crystal touch panel 22.

Liquid crystal touch panel 22 has a function as an input device in addition to a function as a display device. Specifically, liquid crystal touch panel 22 includes a capacitive-type touch panel, and has a touch sensor function capable of receiving an input caused by a touch operation with a user's finger. A user performs a touch operation on liquid crystal touch panel 22 with his/her finger. With this operation, the user can designate a region to be auto-focused, issue a shooting instruction, or select an item on a menu screen. Operation dial 26 is an operation member (so-called jog dial) which can be rotated in a horizontal direction of camera body 5 and can be pushed in a direction vertical to the back surface (main surface at a back surface of the camera) of camera body 5. For example, a user can select a desired item on the setting screen by moving a cursor displayed on liquid crystal touch panel 22 with the operation of rotating operation dial 26. The user can also determine the selected item by pushing operation dial 26.

Operation dial 26 is disposed above liquid crystal touch panel 22 at a position close to liquid crystal touch panel 22. The position close to liquid crystal touch panel 22 means a position of operation dial 26 where a user operating operation dial 26 with his/her finger might erroneously touch liquid crystal touch panel 22 with this finger during the operation of operating operation dial 26.

Upper protection barrier 30 is provided above operation dial 26, and lower protection barrier 28 is provided below operation dial 26. Upper protection barrier 30 and lower protection barrier 28 are formed to protrude from the back surface of casing 10. Upper protection barrier 30 and lower protection barrier 28 may collectively be referred to as a protection barrier. The protection barrier will be described in detail below.

Various operation buttons 25a to 25c and 24 are provided above and at the right side of liquid crystal touch panel 22 on the back surface of digital camera 100. A user can perform various operations (instruction) to digital camera 100 by operating these operation buttons 25a to 25c and 24.

Grip 19 rising toward the back surface is formed at top right on the back surface of casing 10.

Figure 3:
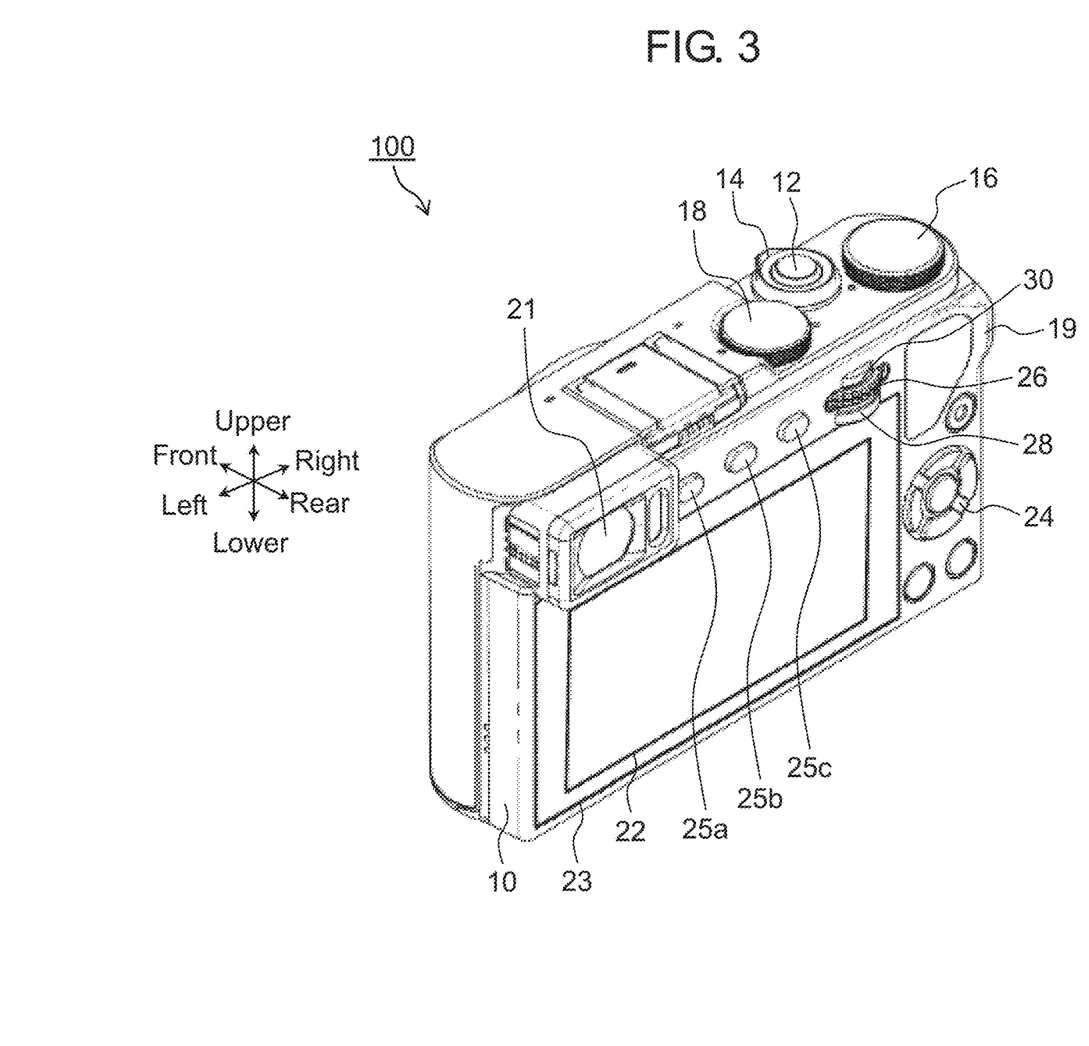
FIG. 3 is a perspective view when the digital camera according to the first exemplary embodiment is viewed from the left rear.

FIG. 3 is a perspective view when digital camera 100 is viewed from the left rear. As illustrated in FIG. 3, grip 19 is formed to rise toward the back surface at the upper right end of the back surface of digital camera 100. A user gripping digital camera 100 with his/her right hand can firmly hold digital camera 100 by pressing grip 19 with his/her right thumb. Accordingly, a camera shake upon shooting can be prevented.

1.1 Protection Barrier

Figure 4:
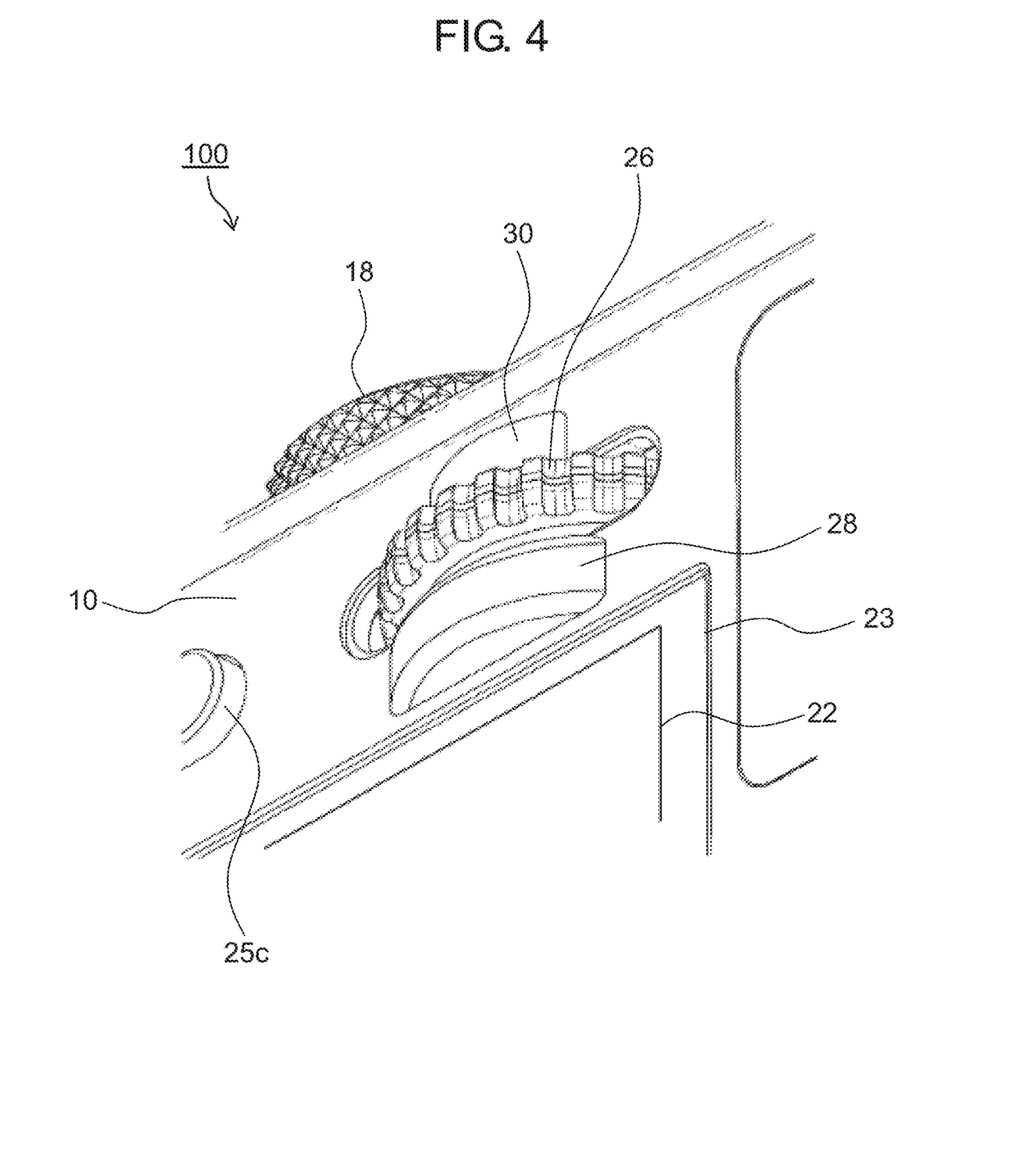
FIG. 4 is a perspective view illustrating a lower part of a vicinity of an operation dial and a protection barrier according to the first exemplary embodiment.
Figure 5:
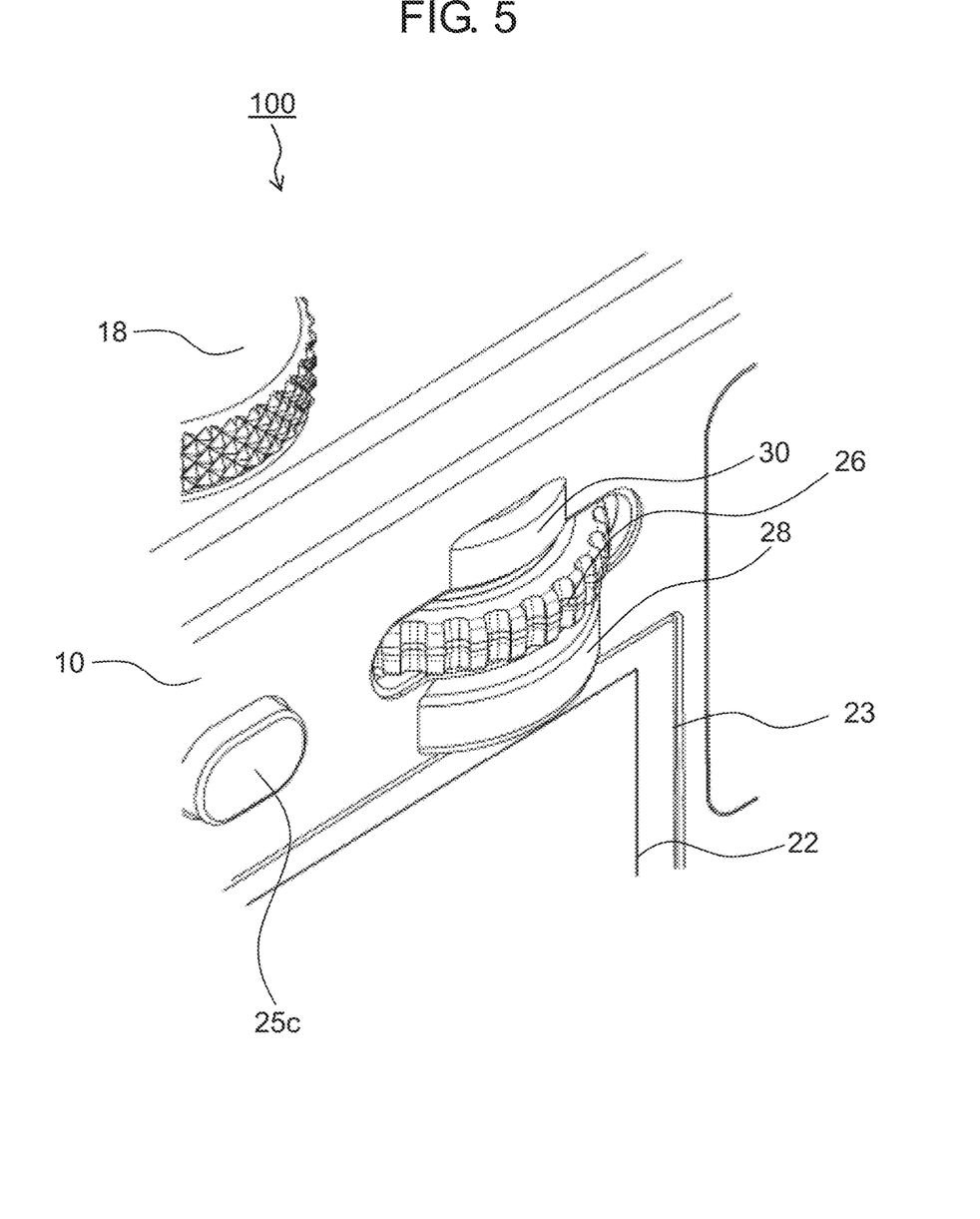
FIG. 5 is a perspective view illustrating an upper part of a vicinity of an operation dial and a protection barrier according to the first exemplary embodiment.

The protection barriers (protruding portion) formed above and below operation dial 26 will be described. FIGS. 4 and 5 are views illustrating in more detail upper protection barrier 30 and lower protection barrier 28 provided respectively above and below operation dial 26 on the back surface of digital camera 100.

As illustrated in FIGS. 2, 4, and 5, operation dial 26 is disposed above liquid crystal touch panel 22 at a position close to liquid crystal touch panel 22. In such an arrangement, when a user operates operation dial 26 with his/her finger, he/she might erroneously touch an upper part of liquid crystal touch panel 22 with this finger during this operation. In particular, when a user pushes operation dial 26, the finger pushing operation dial 26 is likely to touch liquid crystal touch panel 22. When liquid crystal touch panel 22 responds to this erroneous touch to generate a detection signal, there arises a problem such that an operation unintended by the user is executed by digital camera 100.

In the present exemplary embodiment, lower protection barrier 28 is provided between operation dial 26 and liquid crystal touch panel 22 to reduce such an erroneous operation. Lower protection barrier 28 is a protruding portion formed to protrude from the back surface of casing 10. With this configuration, when a user touches operation dial 26 with his/her finger for operating operation dial 26, this finger runs on lower protection barrier 28. Therefore, this finger is difficult to touch the surface of liquid crystal touch panel 22. Accordingly, an erroneous operation to liquid crystal touch panel 22 during an operation of operation dial 26 can be reduced.

Upper protection barrier 30 is provided above operation dial 26. A protruding amount of upper protection barrier 30, which is provided above operation dial 26, from casing 10 is smaller than a protruding amount of lower protection barrier 28, which is provided below operation dial 26, from casing 10. With the configuration described above in which upper protection barrier 30 is provided, and its protruding amount is set to be smaller than the protruding amount of lower protection barrier 28, a user's finger is guided to touch and operate operation dial 26 from the side of upper protection barrier 30 (i.e., from above operation dial 26) as much as possible. This can reduce an erroneous finger touch on the surface of liquid crystal touch panel 22.

The outline of the cross-sectional shape of each protruding portion of upper protection barrier 30 and lower protection barrier 28 is an arc, the cross-sectional shape being obtained by cutting them with a plane vertical to the rotation axis of operation dial 26. Such arc cross-sectional shape facilitates the user to slide his/her finger along upper protection barrier 30 and lower protection barrier 28, which results in enhancing operability when the user rotates operation dial 26.

Figure 6:
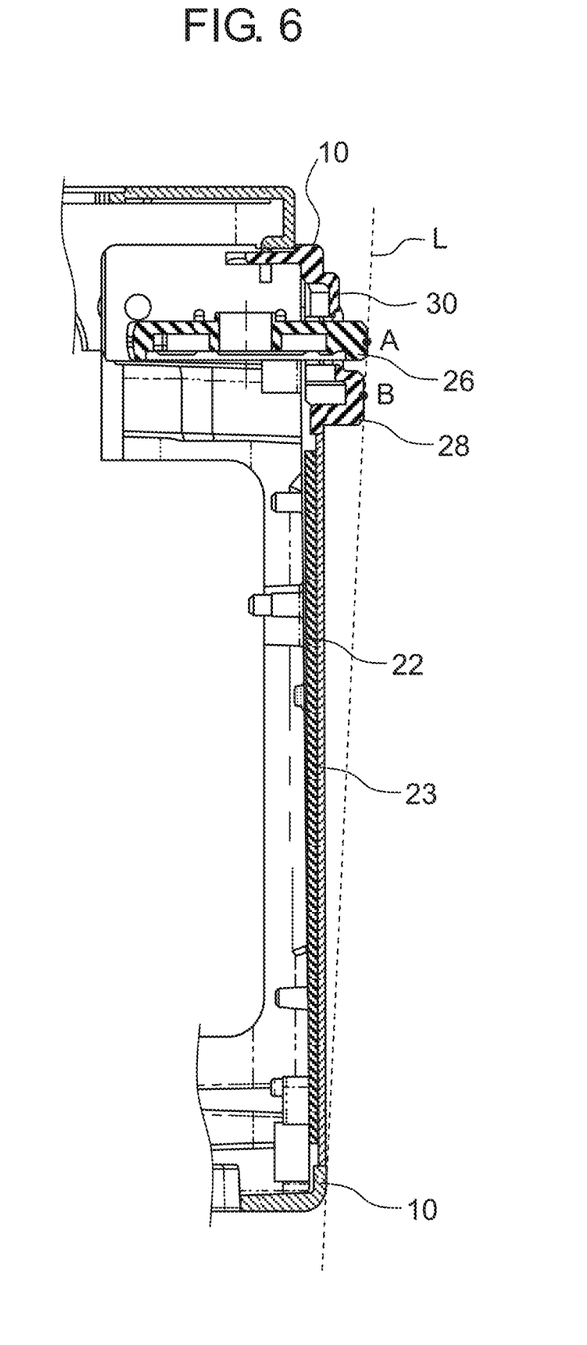
FIG. 6 is a sectional view taken along line 6-6 in FIG. 2.

FIG. 6 is a view for describing a relation in height between operation dial 26 and lower protection barrier 28 provided to the back surface of digital camera 100. Straight line L indicates an extension line linking point A most protruding on operation dial 26 toward the back surface and point B most protruding on lower protection barrier 28 toward the back surface. In other words, straight line L extends downward of digital camera 100 as being in contact with the most protruding portions of operation dial 26 and lower protection barrier 28 toward the back surface. As illustrated in FIG. 6, the height of lower protection barrier 28 is determined such that straight line L does not cross liquid crystal touch panel 22. As illustrated in FIG. 6, the height of lower protection barrier 28 is also determined such that straight line L does not become parallel to liquid crystal touch panel 22. In other words, lower protection barrier 28 is formed to be lower than operation dial 26.

The height of operation dial 26 means a height from the back surface of casing 10, and it is a distance between a plane (reference plane) including the surface of liquid crystal touch panel 22 and point A (most protruding point on operation dial 26 toward the back surface). The height of lower protection barrier 28 means a height from the back surface of casing 10, and it is a distance between the reference plane and point B (most protruding point on lower protection barrier 28 toward the back surface). The same is applied to the height of the later-described upper protection barrier.

When lower protection barrier 28 is too low, an interference of fingers with liquid crystal touch panel 22 cannot sufficiently be prevented. When lower protection barrier 28 is too high, operability of operation dial 26 is deteriorated. With the configuration in which the height of lower protection barrier 28 is set to satisfy the above condition, an erroneous operation (erroneous touch) to liquid crystal touch panel 22 can be reduced with operability of operation dial 26 being maintained.

The height of operation dial 26 in the pushed state is preferably set to be equal to or lower than the height of lower protection barrier 28. Upper protection barrier 30 is set to be lower than the height of operation dial 26 in the pushed state. Specifically, the height of operation dial 26 that is pushed with the push operation is located between the height of lower protection barrier 28 and the height of upper protection barrier 30. With this configuration, an erroneous operation (erroneous touch) to liquid crystal touch panel 22 can be reduced with operability of operation dial 26 upon the push operation being maintained.

Figure 7:
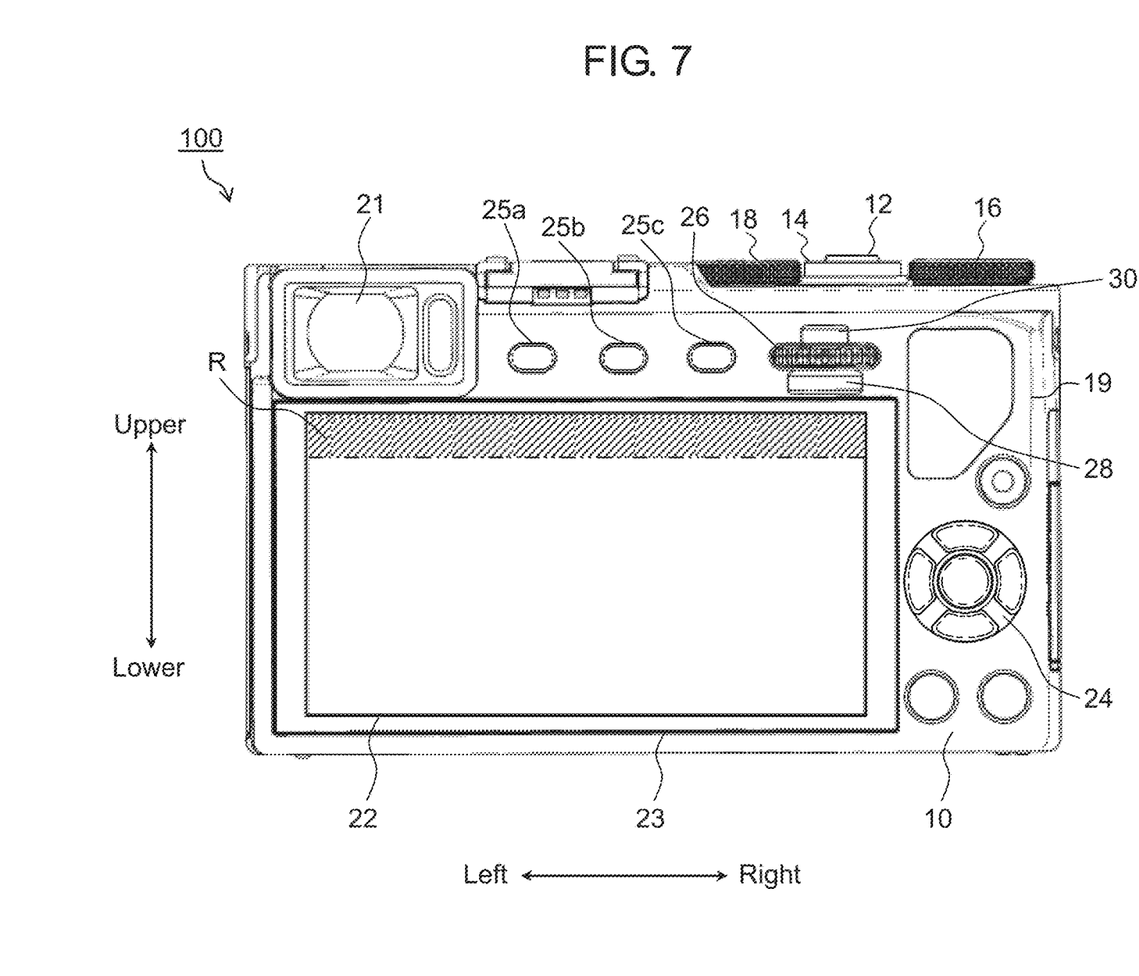
FIG. 7 is a view illustrating a dead zone of a liquid crystal touch panel according to the first exemplary embodiment.

In order to surely reduce an erroneous operation to liquid crystal touch panel 22, a dead zone that is a region not receiving a touch operation may be formed on a part of an upper region of liquid crystal touch panel 22. FIG. 7 is a view for describing an example of dead zone R of liquid crystal touch panel 22. As illustrated in FIG. 7, dead zone R that disables a touch input function is formed on a part of an upper region of liquid crystal touch panel 22. The width of dead zone R is set to be 7 mm to 8 mm in consideration of a width of a human finger, for example. Disabling the touch input function includes the following two cases.

1) When a touch operation is performed on dead zone R, liquid crystal touch panel 22 does not output a detection signal in response to this touch operation.

2) When a touch operation is performed on dead zone R, liquid crystal touch panel 22 outputs a detection signal in response to this touch operation, but this detection signal is not used (is disabled) in a processing (control) of digital camera 100.

With the configuration in which dead zone R is formed at the upper part of liquid crystal touch panel 22 as described above, even when a user's finger touches liquid crystal touch panel 22 with an operation for operation dial 26 regardless of the formation of lower protection barrier 28, this operation to liquid crystal touch panel 22 is disabled. Thus, an erroneous operation to liquid crystal touch panel 22 can surely be reduced.

In the case where dead zone R is formed, it is controlled such that a menu operated by a user is not displayed on this region. Specifically, a menu display region is limited in this case. Whether dead zone R is formed or not on liquid crystal touch panel 22 may appropriately be set by a user.

2. Summary

As described above, digital camera 100 according to the present exemplary embodiment includes casing 10; liquid crystal touch panel 22 (an example of a first operation unit) receiving an operation from a user; operation dial 26 (an example of a second operation unit) receiving an operation from a user; and lower protection barrier 28 (an example of a first protection barrier) formed between liquid crystal touch panel 22 and operation dial 26 so as to protrude from the back surface of casing 10 to which liquid crystal touch panel 22 and operation dial 26 are provided. With this configuration, when a user operates operation dial 26 with his/her finger, this finger runs on lower protection barrier 28, whereby a touch on liquid crystal touch panel 22 with the finger in the operation can be reduced, and therefore, an erroneous operation can be reduced.

With respect to operation dial 26, upper protection barrier 30 (an example of a second protection barrier) may be provided at the side (above operation dial 26) opposite to lower protection barrier 28 across operation dial 26. In this case, a protruding amount of upper protection barrier 30 relative to casing 10 may be set to be smaller than a protruding amount of lower protection barrier 28 relative to casing 10. With this configuration, a user's finger is guided to be in contact with operation dial 26 from above operation dial 26 as much as possible, whereby an erroneous finger touch on the surface of liquid crystal touch panel 22 can be reduced.

As illustrated in FIG. 6, the height of lower protection barrier 28 may be set such that straight line L in contact with most protruding portions A and B of operation dial 26 and lower protection barrier 28 toward the back surface does not cross liquid crystal touch panel 22. With this configuration, an erroneous operation (erroneous touch) to liquid crystal touch panel 22 can be reduced with operability of operation dial 26 being maintained.

As illustrated in FIG. 7, liquid crystal touch panel 22 may have dead zone R which does not receive an input of a touch operation on a part at the side of operation dial 26. With this configuration, an erroneous operation to liquid crystal touch panel 22 can surely be reduced.

Second Exemplary Embodiment

Figure 8:
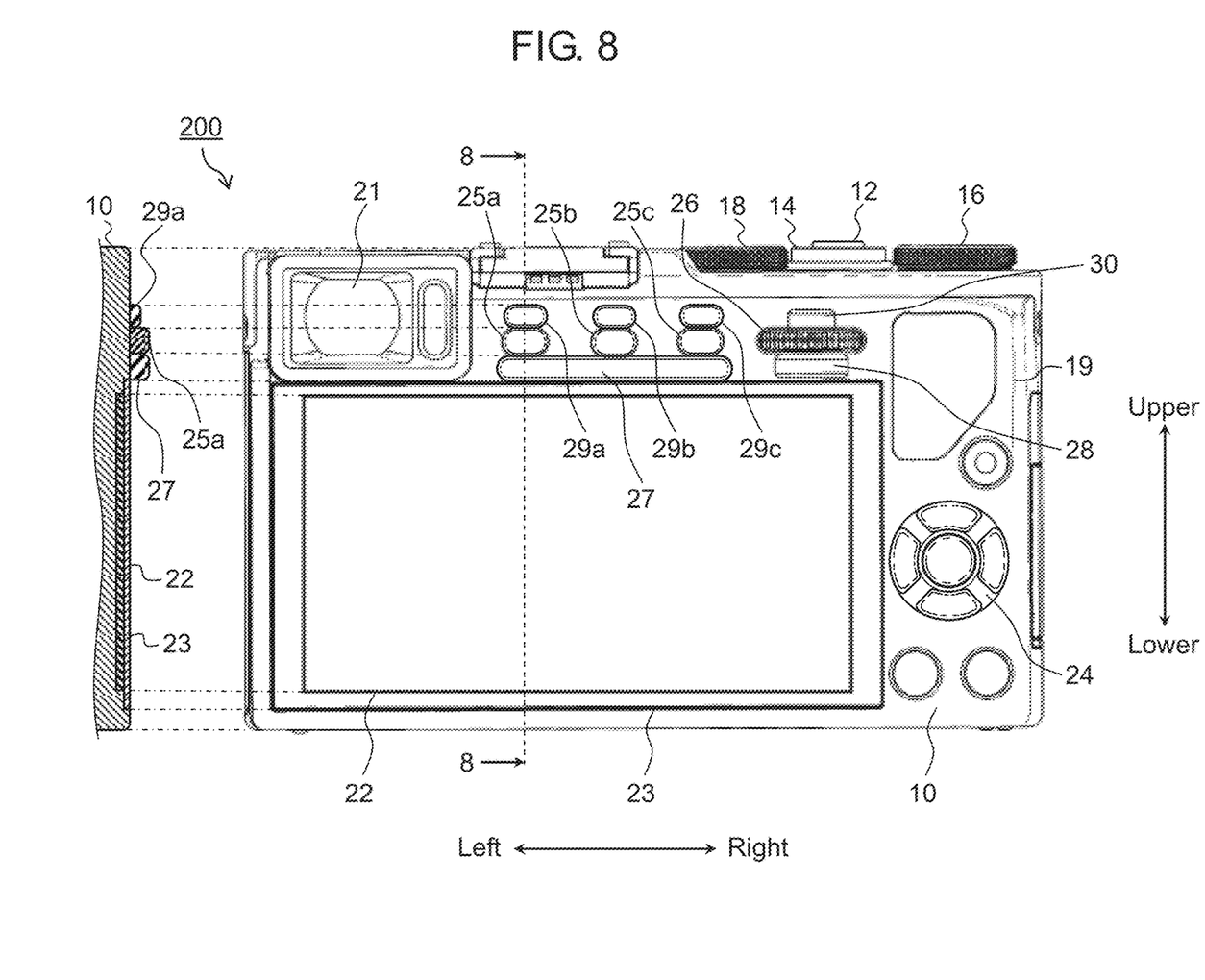
FIG. 8 is a schematic view illustrating a back side and a cross-section of a digital camera according to a second exemplary embodiment.

In the above first exemplary embodiment, lower protection barrier 28 is provided relative to operation dial 26 that is provided above liquid crystal touch panel 22. However, the subject to which a protection barrier is provided is not limited to operation dial 26. FIG. 8 is a schematic view illustrating a back surface and a cross-section of digital camera 200 according to a second exemplary embodiment.

Components having the similar functions as in the first exemplary embodiment are identified by the same reference numerals, and their description will not be repeated. As illustrated in FIG. 8, digital camera 200 includes lower protection barrier 27 between three operation buttons 25a to 25c and liquid crystal touch panel 22, lower protection barrier 27 protruding from the back surface of casing 10. As illustrated in FIG. 8, digital camera 200 includes one lower protection barrier 27 relative to three operation buttons 25a to 25c. This configuration can reduce an erroneous operation caused by an erroneous finger touch on liquid crystal touch panel 22, when a user operates operation buttons 25a to 25c provided above liquid crystal touch panel 22 with his/her finger.

The width of lower protection barrier 27 in the horizontal direction is formed larger than operation buttons 25a to 25c. Specifically, a left side end of lower protection barrier 27 extends to the left from a left side end of operation button 25a, and a right side end of lower protection barrier 27 extends to the right from a right side end of operation button 25c. Each of operation buttons 25a to 25c is sometimes operated from left or right of each button. The above configuration is made to prevent an erroneous operation to liquid crystal touch panel 22 even in such a case.

As illustrated in FIG. 8, three upper protection barriers 29a to 29c may be provided above operation buttons 25a to 25c. Each of three upper protection barriers 29a to 29c corresponds to each of three operation buttons 25a to 25c. Upper protection barriers 29a to 29c are formed such that the height of each of upper protection barriers 29a to 29c from the back surface of casing 10 is lower than the height of lower protection barrier 27. Notably, three upper protection barriers 29a to 29c may be formed integral as one upper protection barrier.

As illustrated in a sectional view taken along line 8-8 in FIG. 8, lower protection barrier 27 is formed such that the height of lower protection barrier 27 from the back surface of casing 10 is lower than operation buttons 25a to 25c. The height of operation buttons 25a to 25c in the pushed state is preferably set to be equal to or lower than the height of lower protection barrier 27. The height of upper protection barriers 29a to 29c is set to be smaller than the height of operation buttons 25a to 25c in the pushed state. With this configuration, an erroneous operation (erroneous touch) to liquid crystal touch panel 22 can be reduced with operability of operation buttons 25a to 25c in the pushed state being maintained.

Similar to upper protection barriers 29a to 29c, lower protection barrier 27 may be provided as being split into three lower protection barriers. In this case, the widths of the respective split lower protection barriers in the horizontal direction are preferably formed larger than corresponding operation buttons 25a to 25c. This is to surely prevent an erroneous operation to liquid crystal touch panel 22 for an operation to operation buttons 25a to 25c from left or right.

Third Exemplary Embodiment

Figure 9:
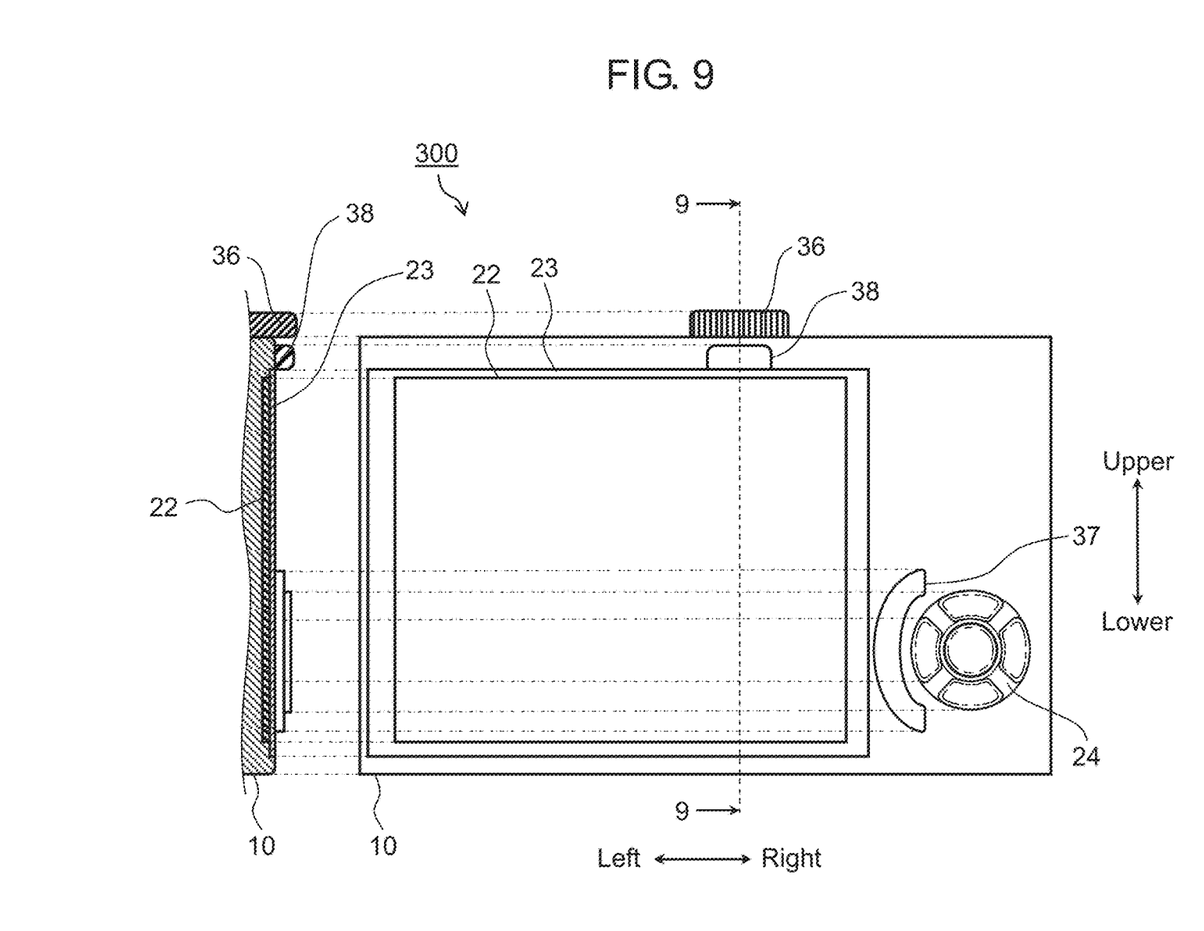
FIG. 9 is a schematic view illustrating a back side and a cross-section of a digital camera according to a third exemplary embodiment.

In the above exemplary first embodiment, operation dial 26 serving as an operation unit is provided to the back surface of casing 10, and lower protection barrier 28 is disposed between operation dial 26 and liquid crystal touch panel 22. However, the operation unit is not necessarily provided to the back surface of casing 10. FIG. 9 is a schematic view illustrating a back surface and a cross-section of digital camera 300 according to a third exemplary embodiment. Operation dial 36 of digital camera 300 is provided to top surface of casing 10 such that a part thereof protrudes from the back surface of casing 10 to the rear side. Protection barrier 38 is provided between operation dial 36 and liquid crystal touch panel 22. Protection barrier 38 is provided to protrude from the back surface of casing 10, and its protruding amount is set to be smaller than the protruding amount of operation dial 36.

Digital camera 300 also includes protection barrier 37 between liquid crystal touch panel 22 and operation button 24 provided at the right side of liquid crystal touch panel 22. This configuration can reduce an erroneous finger touch on liquid crystal touch panel 22, when a user operates the operation button provided at the side of liquid crystal touch panel 22 with his/her finger. Protection barrier 37 is formed such that its height from the back surface of casing 10 is lower than the height of operation button 24.

Other Exemplary Embodiments

The first to third exemplary embodiments have been described above as illustrative examples of the technique disclosed in the present application. However, the technique in the present disclosure is not limited thereto, and it can be applied to embodiments to which various changes, substitutions, additions, omissions, and the like can be made. Moreover, the components described in the above exemplary embodiments can be combined to provide a new embodiment. Other exemplary embodiments will be described below.

In the above exemplary embodiments, upper protection barrier 30 is provided above operation dial 26 disposed above liquid crystal touch panel 22, thereby enhancing operability of operation dial 26. However, upper protection barrier 30 is not necessarily required from the viewpoint of an erroneous operation to liquid crystal touch panel 22.

In the above exemplary embodiments, liquid crystal touch panel 22 and operation dial 26 are provided to the back surface of the device. However, these operation units are not necessarily provided to the back surface of the device, and they may be provided to other positions. In summary, in the case where an operation dial is provided in the vicinity of a liquid crystal touch panel, and the liquid crystal touch panel is likely to be erroneously touched by a finger, which operates the operation dial, to cause an erroneous operation of the liquid crystal touch panel, the idea (to provide a protection barrier between the liquid crystal touch panel and the operation dial) of the above exemplary embodiments can be applied.

A shape and size of the protection barrier are not limited to those described in the above exemplary embodiments. In summary, the protection barrier may have a shape and size by which a finger, which operates the operation unit (operation button, operation dial) provided to be close to liquid crystal touch panel 22, runs on the protection barrier to prevent an erroneous touch on liquid crystal touch panel 22 with this finger.

In the above exemplary embodiments, liquid crystal touch panel 22 is a capacitive-type touch panel. However, it may be a resistive-type touch panel.

In the above exemplary embodiments, a digital camera is a lens interchangeable digital camera. However, a digital camera may be a lens-body integrated digital camera.

In the above first exemplary embodiment, straight line L extending downward of digital camera 100 as being in contact with most protruding points A and B of operation dial 26 and lower protection barrier 28 toward the back surface does not cross liquid crystal touch panel 22. However, straight line extending downward of digital camera 100 as being in contact with outer shapes of operation dial 26 and lower protection barrier 28 is not necessarily in contact with the most protruding points of operation dial 26 and lower protection barrier 28 toward the back surface, depending on the outer shape of operation dial 26 or lower protection barrier 28. Lower protection barrier 28 may be configured such that the straight line extending downward of digital camera 100 as in contact with the outer shapes of operation dial 26 and lower protection barrier 28 does not cross liquid crystal touch panel 22. As for the protruding amount, the similar relationship between operation dial 26 and lower protection barrier 28 can be applied to the relationship between operation buttons 25a to 25c and lower protection barrier 27, the relationship between operation dial 36 and protection barrier 38, and the relationship between operation button 24 and protection barrier 37 in the second and third exemplary embodiments.

In the above exemplary embodiments, upper protection barriers 29a to 29c and 30, lower protection barriers 27 and 28, and protection barriers 37 and 38 are formed integral with casing 10. However, the present disclosure is not limited thereto. The protection barrier may be made of a member different from casing 10.

In the above exemplary embodiments, a digital camera has been described as one example of an electronic device. However, the above disclosure is applicable to another electronic device. In particular, the above disclosure is applicable to an electronic device (e.g., an imaging apparatus such as a digital camera and a movie camera, and a cellular phone) including: a touch operation unit (e.g., a liquid crystal touch panel) that performs an input with a touch operation; and an operation unit (e.g., an operation dial or an operation button) disposed close to the touch operation unit.

The exemplary embodiments have been described above as illustrative examples of the technique in the present disclosure. For this purpose, the accompanying drawings and the detailed description are provided.

Therefore, components in the accompanying drawings and the detail description may include not only components essential for solving problems, but also components that are provided to illustrate the above described technique and are not essential for solving problems. Therefore, such inessential components should not be readily construed as being essential based on the fact that such inessential components are shown in the accompanying drawings and mentioned in the detailed description.

Further, the above described embodiments have been described to exemplify the technique according to the present disclosure, and therefore, various modifications, replacements, additions, and omissions may be made within the scope of the claims and the scope of the equivalents thereof.

The present disclosure is applicable to an electronic device including a plurality of operation units (e.g., a liquid crystal touch panel and an operation dial) that are provided to be close to one another. For example, the present disclosure is applicable to digital cameras, movie cameras, and cellular phones.

What is claimed is:
1. An electronic device comprising:
   a casing;
   a first operation unit that is on the casing, is configured to receive an operation from a user and has a first plane on which the operation is to be received;
   a second operation unit that is on the casing, is configured to receive an operation from the user and has a second plane parallel to the first plane; and
   a first protection barrier between the first operation unit and the second operation unit protruding from a plane of the casing on which the first operation unit and the second operation unit are disposed,
   wherein the first protection barrier is configured to prevent erroneous touching of the first operation unit during operation of the second operation unit, and
   wherein the second operation unit is disposed at a position such that, without the first protection barrier, operation of the second operation unit could result in the erroneous touching of the first operation unit,
   wherein the second operation unit is a dial configured to enable an input with a rotary operation performed by the user,
   wherein a portion of the first protection barrier protruding from the plane of the casing is a barrier protrusion portion, and a portion of the second operation unit protruding from the plane of the casing is a dial protrusion portion,
   wherein an outline shape of a cross section of the barrier protrusion portion in a first plane perpendicular to a rotation axis of the dial is an arc shape, and
   wherein the outline shape of the cross section of the barrier protrusion portion corresponds to an outline shape of a cross section of the dial protrusion portion in a second plane perpendicular to the rotation axis.
2. The electronic device according to claim 1,
   wherein the first operation unit is a touch operation unit configured to enable an input with a touch operation performed by the user.
3. The electronic device according to claim 2,
   wherein the first operation unit has a dead zone that does not receive the input with the touch operation, the dead zone being at a part of an input region at a first protection barrier side.
4. The electronic device according to claim 1,
   wherein the dial is configured to enable the input with a push operation as well as the rotary operation.
5. The electronic device according to claim 1,
   wherein a height of the first protection barrier is set such that a straight line in contact with the second operation unit and the first protection barrier does not cross the first operation unit.
6. The electronic device according to claim 1,
   further comprising a second protection barrier for the second operation unit at an opposite side of the first protection barrier across the second operation unit.
7. The electronic device according to claim 6,
   wherein a protruding amount of the second protection barrier from the casing is smaller than a protruding amount of the first protection barrier from the casing.
8. The electronic device according to claim 1,
   wherein the electronic device includes an imaging apparatus configured to capture an object to generate image data.
9. The electronic device according to claim 1, wherein the second operation unit is above the first operation unit.

* * * * *